United States Patent [19]

Schlarb et al.

[11] Patent Number: 5,616,644
[45] Date of Patent: Apr. 1, 1997

[54] DYESTUFF-CONTAINING AQUEOUS DISPERSIONS

[75] Inventors: Bernhard Schlarb; Kurt Wendel; Helmut Bellaire; Karin H. Beck, all of Ludwigshafen, Germany

[73] Assignee: BASF Aktiengesellschaft, Ludwigshafen, Germany

[21] Appl. No.: 495,902

[22] Filed: Jun. 28, 1995

[30] Foreign Application Priority Data

Jul. 6, 1994 [DE] Germany .......................... 44 23 610.7

[51] Int. Cl.⁶ .................................................. C08L 33/00
[52] U.S. Cl. ...................... 524/522; 524/556; 524/533; 524/558; 524/560; 524/565; 524/831; 524/832
[58] Field of Search ..................... 524/556, 533, 524/558, 560, 565, 831, 832, 522

[56] References Cited

U.S. PATENT DOCUMENTS

| | | | |
|---|---|---|---|
| 3,694,394 | 9/1972 | Freeman | 524/522 |
| 3,719,628 | 3/1973 | Bergomi et al. | 524/522 |
| 4,164,488 | 8/1979 | Gregorovich et al. | 260/29.4 |
| 4,243,430 | 1/1981 | Sperry et al. | 106/308 M |
| 4,503,184 | 3/1985 | Marongiu | 524/522 |
| 4,900,774 | 2/1990 | Mitsuji et al. | 524/512 |
| 4,981,901 | 1/1991 | Noda et al. | 524/504 |
| 5,162,420 | 11/1992 | Chang et al. | 524/558 |
| 5,322,865 | 6/1994 | Inoue et al. | 524/501 |
| 5,348,997 | 9/1994 | Kato et al. | 524/556 |

FOREIGN PATENT DOCUMENTS

| | | |
|---|---|---|
| 0342042 | 11/1989 | European Pat. Off. . |
| 0401565 | 12/1990 | European Pat. Off. . |
| 2301578 | 9/1976 | France . |
| 4232721 | 3/1994 | Germany . |

*Primary Examiner*—Paul R. Michl
*Assistant Examiner*—Olga Asinovsky
*Attorney, Agent, or Firm*—Oblon, Spivak, McClelland, Maier & Neustadt, P.C.

[57] ABSTRACT

Dyestuff-containing aqueous dispersions obtainable by
a) preparation of at least two copolymers A) and B) in an organic solvent by solution polymerization,
   A) containing from 5 to 50 % by weight, based on A), of an ethylenically unsaturated acid and
   B) being essentially free of ethylenically unsaturated acids and the solution polymerization of the copolymers A) or B) being carried out in the presence of the other respective copolymer A) or B) already prepared,
b) addition of a dyestuff before, during or after the solution polymerization,
c) dispersion of the resulting solution in water and
d) removal of the organic solvent if desired, are described.

6 Claims, No Drawings

DYESTUFF-CONTAINING AQUEOUS DISPERSIONS

The invention relates to dyestuff-containing aqueous dispersions obtainable by a) preparation of at least two copolymers A) and B) in an organic solvent by solution polymerization,
   A) containing from 5 to 50% by weight, based on A), of an ethylenically unsaturated acid and
   B) being essentially free of ethylenically unsaturated acids and the solution polymerization of the copolymers A) or B) being carried out in the presence of the other respective copolymer A) or B) already prepared, b) addition of a dyestuff before, during or after the solution polymerization, c) dispersion of the resulting solution in water and d) removal of the organic solvent if desired.

In addition, the invention relates to a process for preparing the aqueous dispersions and to the use of the dispersions as coating substances or in or as recording means.

JP-A-04/1272 discloses dyestuff-containing secondary dispersions which are prepared by polymerization in an organic solvent, addition of the dyestuff and subsequent dispersion in water.

EP-A-225 612 describes secondary dispersions which are obtained by two-stage polymerization in an organic solvent and subsequent dispersion in water.

Water-insoluble dyestuff-containing secondary dispersions known hitherto have the disadvantage that the dyestuff is not absorbed in an adequate quantity by the dispersed polymer particles.

A high dyestuff content, however, is desired in order to obtain coatings or recording fluids having a high covering power. Furthermore, the coatings or recording fluids should have a good resistance to light and water.

It is an object of the present invention to provide aqueous dispersions which contain high amounts of dyestuff and are thus suitable for the abovementioned uses.

We have found that this object is achieved by the aqueous dispersions defined above, a process for their preparation and their use as coating compositions or in or as recording fluids.

In process step a) for preparing the aqueous dispersions according to the invention, at least two, preferably two, copolymers A) and B) are prepared in an organic solvent by free-radical polymerization. The preparation of the copolymer A) or B) takes place first. The monomers of the remaining copolymer A) or B) are then polymerized in the presence of the copolymer A) or B) already prepared.

Preferably, copolymer A) is first prepared.

In the polymerization, the monomers can be present completely or partly in the individual stages. The monomers can also be metered in during the polymerization.

The copolymers A) and B) differ in the composition of the monomers.

Copolymer A) contains from 5 to 50% by weight, preferably from 10 to 40% by weight, of an ethylenically unsaturated acid, eg. of a carboxylic acid, dicarboxylic acid or their anhydrides. In the case of the anhydride, a hydrolysis takes place in order to have the desired quantity of acid in the polymer. Acrylic acid, methacrylic acid, itaconic acid, maleic acid, fumaric acid or maleic or fumaric anhydride, for example, may be mentioned. In particular, the content of the acids is selected such that the copolymer A) has an acid number of from 5 to 300, particularly preferably from 20 to 200, very particularly preferably from 30 to 150 and specifically from 70 to 120, mg of KOH/g of copolymer A) (DIN 53 402).

In addition to the unsaturated acids, copolymer A) preferably contains principle monomers, selected from $C_1$–$C_{20}$-alkyl (meth)acrylates, vinyl esters of carboxylic acids containing up to 20 C atoms, vinylaromatics having up to 20 C atoms, ethylenically unsaturated nitriles, vinyl halides and aliphatic hydrocarbons having 2 to 8 C atoms and 1 or 2 double bonds, or their mixtures.

Principle monomers which may be mentioned are eg. alkyl (meth)acrylates having a $C_1$–$C_{10}$-alkyl radical, such as methyl methacrylate, methyl acrylate, n-butyl acrylate, ethyl acrylate and 2-ethylhexyl acrylate.

In particular, mixtures of the alkyl (meth)acrylates are also suitable.

Vinyl esters of carboxylic acids having 1 to 20 C atoms are eg. vinyl laurate or stearate, vinyl propionate and vinyl acetate.

Suitable vinylaromatic compounds are vinyltoluene, α- and p-methylstyrene, α-butylstyrene, 4-n-butylstyrene, 4-n-decylstyrene and preferably styrene.

Examples of nitriles are acrylonitrile and methacrylonitrile.

The vinyl halides are ethylenically unsaturated compounds substituted by chlorine, fluorine or bromine, preferably vinyl chloride and vinylidene chloride.

Nonaromatic hydrocarbons having 2 to 8 C atoms and one or two olefinic double bonds which may be mentioned are butadiene, isoprene and chloroprene, as well as ethylene, propylene and isobutylene.

The principle monomers are also preferably employed in a mixture.

Vinylaromatic compounds such as styrene are frequently employed eg. in a mixture with $C_1$–$C_{20}$-alkyl (meth)acrylates, in particular with $C_1$–$C_8$-alkyl (meth)acrylates or nonaromatic hydrocarbons such as isoprene or preferably butadiene.

Alkyl (meth)acrylates, styrene and mixtures of the alkyl (meth)acrylates or their mixtures with styrene are particularly preferred as principle monomers.

Preferably, the polymer polymerized by free radicals consists to at least 40, particularly preferably to at least 60, % by weight of the principle monomers.

Other ethylenically unsaturated monomers which the copolymer A) can contain are, in particular, hydroxyl-containing monomers such as hydroxyalkyl (meth)acrylates, eg. hydroxypropyl or hydroxy-ethyl (meth)acrylate.

polymers-containing hydroxyl groups can be crosslinked, eg. with melamine resins or polyisocyanates, in particular water-emusifiable polyisocyanates. The content of hydroxyl-containing monomers is preferably selected such that the OH number of the polymer is from 0 to 200, particularly preferably from 0 to 150, very particularly preferably from 0 to 100 and in particular from 0 to 30, mg/KOH/g of polymer (DIN 53 240). In addition, the polymer can also contain eg. monomers containing carbonyl groups and can thus be crosslinked eg. with polyhydrazides.

The weight-average molecular weight ($M_w$) of the copolymer A) is preferably from 20,000 to 500,000, particularly preferably from 50,000 to 200,000 and very particularly preferably from 70,000 to 120,000 (determined by gel-permeation chromatography, using polystyrene as a standard).

Copolymer B) is essentially free of acid groups and preferably essentially consists of the abovementioned principle monomers and other monomers with the exception of ethylenically unsaturated acids, eg. carboxylic acids, dicarboxylic acids or anhydrides which are hydrolyzed to acids.

What has been said about the synthesis of copolymer A) otherwise applies to the synthesis of copolymer B).

The proportion of the copolymer A) is preferably from 95 to 20, particularly preferably from 80 to 25 and very particularly preferably from 50 to 30, % by weight, and that of B) is preferably from 80 to 5, particularly preferably from 75 to 20 and very particularly preferably from 70 to 50, % by weight, in each case based on the sum of A)+B).

Suitable organic solvents in process step a) are in particular those having a boiling point of below 100° C. at 1 bar, or those which with water form an azeotrope having a boiling point of below 100° C. at 1 bar, such that the solvent can easily be removed again in process step d) if required.

Solvents which may be mentioned are eg. butanol, isobutanol, propanol, ethanol and methanol.

The ethylenically unsaturated monomers can be polymerized in a known manner purely by heat or preferably in the presence of initiators. Free radical-forming initiators which may be mentioned are eg. azobiscarboxamides, azobiscarbonitriles, peracid esters or peroxides. The quantity of the initiator is preferably from 0.2 to 5, particularly preferably from 0.5 to 3, % by weight, based on the monomers. The polymerization temperature is preferably from 50° to 150° C., particularly preferably from 80° to 130° C. If desired, regulators, eg. mercaptoethanol, tertiary dodecylmercaptan or diisopropyl xanthogenate, preferably in quantities of from 0 to 3% by weight, based on the monomers, can be added.

After preparation of the copolymers A) and B), a dispersion or, preferably, solution of the copolymers in the organic solvent is obtained. The solid content is preferably from 50 to 95, in particular from 60 to 85, % by weight.

In process step b), a dyestuff is added. The dyestuff can be added to the organic solvent before or during the preparation of the copolymers. Preferably, the dyestuff is added to the organic solution obtained after the preparation of the copolymers. In any case, the dyestuff is added before dispersion in water. Preferably, it is a dyestuff which is largely, preferably completely, soluble in the organic solvent. The dyestuff is preferably largely insoluble in water and in particular soluble to less than 0.1 g/l in water at 20° C. For better dissolution of the dyestuff in the organic solvent, the temperature can be increased eg. to from 50° to 120° C., preferably from 70° to 105° C.

Suitable dyestuffs, in particular also for recording fluids, are eg. metal complex dyestuffs, eg. 1:1 or 1:2 chromium, cobalt, nickel or iron complexes of azo dyestuffs which have, for example, hydroxyl groups and/or carboxyl groups ortho to the azo group, mono- or disazo dyestuffs which are free of ionic groups, anthraquinone dyestuffs, coumarin dyestuffs, methine or azamethine dyestuffs.

The quantity of the dyestuff is preferably from 5 to 200, in particular from 10 to 150 and particularly preferably from 50 to 100, % by weight, based on the copolymers A) and B).

Before dispersion in water (process step c)) and preferably after the addition of the dyestuff, acid groups of the copolymers A) and B) are completely or partly neutralized with a suitable base, eg. ammonia or organic amines, eg. triethylamine.

For dispersion in water, in general no emulsifier or protective colloid needs to be added. The dispersions obtained are stable even without surface-active auxiliaries of this type.

The pH of the aqueous dispersion obtained after dispersion is preferably from 6 to 10, in particular from 7 to 9. The solids content of the aqueous dispersion is preferably from 30 to 70, in particular from 40 to 60, % by weight, based on the dispersion. The organic solvent can be removed to the desired extent, eg. by distillation, if appropriate under reduced pressure.

Preferably, residual contents of organic solvent in the dispersion are below 5, particularly preferably below 1% by weight.

The dispersions are suitable as coating compositions for all sorts of substrates, eg. glass, plastic, metal, wood, paper, etc.

As coatings, the dyestuff-containing dispersions have a high covering power and are also suitable eg. as or in recording fluids.

EXAMPLES

Preparation of the Dispersions According to the Invention a) Solution polymers I–IV The initial mixture was initially introduced into a 4-liter glass reactor having an anchor stirrer, reflux condenser and oil heating and air was replaced by nitrogen.

The initial mixture was heated to 105° C. 10 g of the feed 3 were then added and after that the remainder of feed 1 and 45 g of feed 3 were metered in in the course of 2 hours and stirring of the mixture was then continued for a further hour. Feed 2 and 100 g of feed 3 were then metered in in the course of 2.5 hours. The remainder of feed 3 was then metered in in the course of 1 hour and stirring was then continued for a further hour. (For composition of the solution polymers see Table 1.)

TABLE 1

|  | I | II | III | IV |
|---|---|---|---|---|
| Initial mixture: | | | | |
| Isobutanol | 200 | 200 | 200 | 200 |
| Feed 1 | 60 | 60 | 60 | 60 |
| Feed 1: | | | | |
| Methacrylic acid | 120 | 120 | 60 | 90 |
| MMA | 160 | 160 | 200 | 180 |
| n-BA | 90 | 90 | 110 | 100 |
| Styrene | — | — | — | — |
| HEMA | 30 | 30 | 30 | 30 |
| Feed 2: | | | | |
| MMA | 320 | 320 | 320 | 320 |
| n-BA | 250 | 260 | 260 | 260 |
| Styrene | — | — | — | — |
| HEMA | 20 | 20 | 20 | 20 |
| MTMO | 10 | — | — | — |
| Feed 3: | | | | |
| t-BPO | 50 | 50 | 50 | 50 |
| Isobutanol | 185 | 185 | 185 | 185 |
| Isobutanol |  | 67 |  |  |
| SC (%) | 71.7 | 68.0 | 71.3 | 72.0 |
| K | 26 | 30 | 26 | 26 |
| AN | 78 |  | 37 | 56 |

(Data in g)
Abbreviations:
MMA: methyl methacrylate
t-BPO: tertiary butyl peroctoate
n-BA: n-butyl acrylate
HEMA: hydroxyethyl methacrylate
MTMO: 3-mercaptopropyltrimethoxysilane
SC: solids content
K: K value according to Fikentscher
AN: acid number b) Preparation of the Dispersions 1–6

The polymer solution obtained in a) was warmed to 60° C. The dyestuff and the isobutanol were then added with stirring and stirring was continued at 60° C. for 30 min. The base (DMEA or aqueous 25% strength by weight ammonia solution) was then metered in with stirring in the course of 15 min. 250 g of water were then metered in with stirring. An isobutanol/water mixture was distilled off under reduced pressure, fresh water being metered in simultaneously such that the viscosity of the dispersion remained at the same level (see Table 2).

TABLE 2

| Dispersion | 1 | 2 | 3 | 4 | 5 | 6 |
|---|---|---|---|---|---|---|
| Initial mixture: | | | | | | |
| Polymer | I | I | I | II | III | IV |
| (g) | 200 | 200 | 200 | 210 | 210 | 205 |
| Solid polymer (g) | 143 | 143 | 143 | 143 | 150 | 150 |
| Neopen ®X 58[1)] (g) | 100 | 100 | 150 | 150 | 150 | 150 |
| Ratio Polymer:DS[4)] | 1.43 | 1.43 | 0.95 | 0.95 | 1 | 1 |
| Isobutanol (g) | 100 | 100 | 150 | 150 | 150 | 150 |
| DMEA[2)] | 6 | | | | | |
| aq. NH$_3$ | — | 13.6 | 8.2 | 13.6 | 8 | 8 |
| SC (%) | 44.0 | 38.4 | 38.0 | 37.5 | 47.7 | 37.5 |
| pH | 7.2 | 7.3 | 6.6 | 7.5 | 7.8 | 7.3 |
| i-BuOH (%)[3)] | 1.2 | 7.3 | 3.9 | 5.1 | 0.5 | 0.8 |
| Visc. (mPas) | 180 | 1,500 | 300 | 5,000 | 750 | 600 |

[1)]Metal complex dyestuff
[2)]DMEA: dimethylethanolamine
[3)]Residual content of isobutanol in the dispersion
[4)]DS: dyestuff Preparation of the Comparison Dispersions a) Solution Polymers I' and II'

The initial mixture was initially introduced into a 4-liter glass reactor having an anchor stirrer, reflux condenser and oil heating and air was replaced by nitrogen.

The initial mixture was heated to 105° C. The feed 1 and 56 g of feed 2 were then metered in in the course of 3 hours. The remainder of feed 2 was then metered in in the course of 30 min and stirring was then continued for a further hour (for composition see Table 3).

TABLE 3

| | I' | II' |
|---|---|---|
| Initial mixture: | | |
| Isobutanol | 200 | 200 |
| Feed 1 | — | — |
| Feed 1: | | |
| Methacrylic acid | 120 | 100 |
| MMA | 480 | 490 |
| n-BA | 340 | 350 |
| Styrene | — | — |
| HEMA | 50 | 50 |
| MTMO | 10 | 10 |
| Feed 2: | | |
| t-BPO | 20 | 20 |
| Isobutanol | 52 | 52 |
| Feed 3: | | |
| t-BPO | 5 | 5 |
| Isobutanol | 20 | 20 |
| SC (%) | 78.8 | 79.2 |
| K | 28 | 28 |
| AN | 77 | 65 | b) Preparation of the Dispersions

The preparation was carried out as described above for the dispersions according to the invention (see Table 4)

TABLE 4

| Comparison Dispersion | V1 | V2 | V3 |
|---|---|---|---|
| Initial mixture: | | | |
| Polymer | I' | I' | II' |

TABLE 4-continued

| Comparison Dispersion | V1 | V2 | V3 |
|---|---|---|---|
| (g) | 200 | 200 | 200 |
| Solid polymer (g) | 157 | 157 | 158 |
| Neopen X 58 | 100 | 100 | 150 |
| Ratio Polymer:DS | 1.57 | 1.57 | 1.05 |
| Isobutanol (g) | 100 | 100 | 100 |
| DMEA (g) | 7 | — | 8 |
| aq. NH$_3$ (g) | — | 15 | — |
| SC (%) | 44.6 | 34.8 | 51.1 |
| pH | 7.3 | 7.7 | 7.6 |
| i-BuOH (%) | | 3.7 | 4.1 |
| Visc. (mPas) | 600 | pasty | 2,500 |

Application tests:

Aqueous recording inks can be prepared from the secondary dispersions according to the invention according to customary technological recipes. Recording inks were prepared using the following recipe:

50 parts of dyestuff-containing secondary dispersions 1 to 6 and V1 to V3

35 parts of water 14 parts of diglycol as diethylene glycol 1 part of polyethylene glycol as auxiliary The inks were filled into a felt stylus. Sample graphics were then applied to a sheet of paper with the aid of an X-Y recorder. The fastness to water (by action of water) and the fastness to light (Xenotest) was tested on these. The inks investigated here proved absolutely water-resistant. The fastness to light was likewise very good.

The graphics produced using the dispersions according to the invention had a high gloss.

The graphics prepared using the comparison dispersions were mat. The cause of this is that the dispersed polymer particles have not absorbed the dyestuff in an adequate quantity.

We claim:

1. A dyestuff-containing aqueous dispersion obtainable by
   a) preparation of at least two copolymers A) and B) in an organic solvent by solution polymerization, said copolymers A) and B) each consisting essentially of monomers derived from ethylenically unsaturated monomers, and which may optionally be crosslinked, copolymer A) containing from 5 to 50% by weight, based on copolymer A), of an ethylenically unsaturated acid and copolymer B) being essentially free of ethylenically unsaturated acids and the solution polymerization of the copolymers A) or B) being carried out in the presence of the other respective copolymer A) or B) already prepared,
   b) addition of a substantially water-insoluble dyestuff before, during or after the solution polymerization,
   c) dispersion of the resulting solution in water and
   d) removal of the organic solvent if desired.

2. An aqueous dispersion as claimed in claim 1, the proportions by weight of the copolymer A) being from 95 to 20% by weight and those of the copolymer B) being from 5 to 80% by weight, based on the sum A)+B).

3. An aqueous dispersion as claimed in claim 1, the content of the acids in copolymer A) being selected such that copolymer A) has an acid number of from 5 to 300.

4. A process for preparing aqueous dispersions as claimed in claim 1, comprising the process steps a) to d).

5. A substrate coated with an aqueous dispersion as claimed in claim 1 and dried.

6. A recording fluid containing an aqueous dispersion as claimed in claim 1.

* * * * *